Oct. 27, 1925.  
A. N. RIGGS  
1,558,924  
FRUIT GATHERING APPARATUS  
Filed Nov. 14, 1923    2 Sheets-Sheet 1
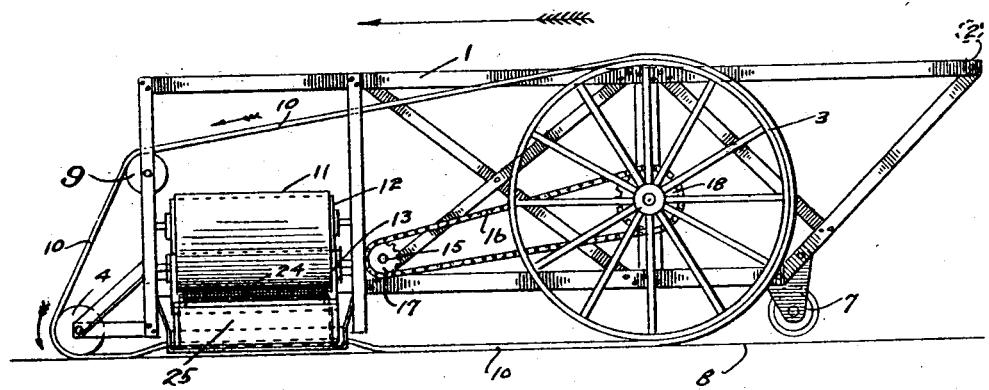
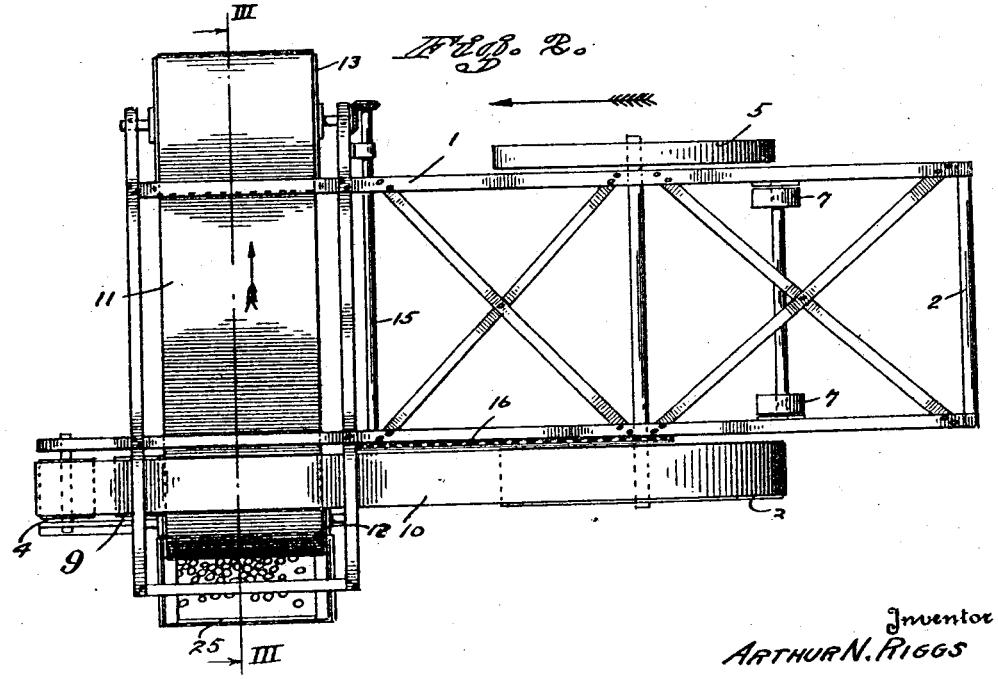
Inventor  
ARTHUR N. RIGGS

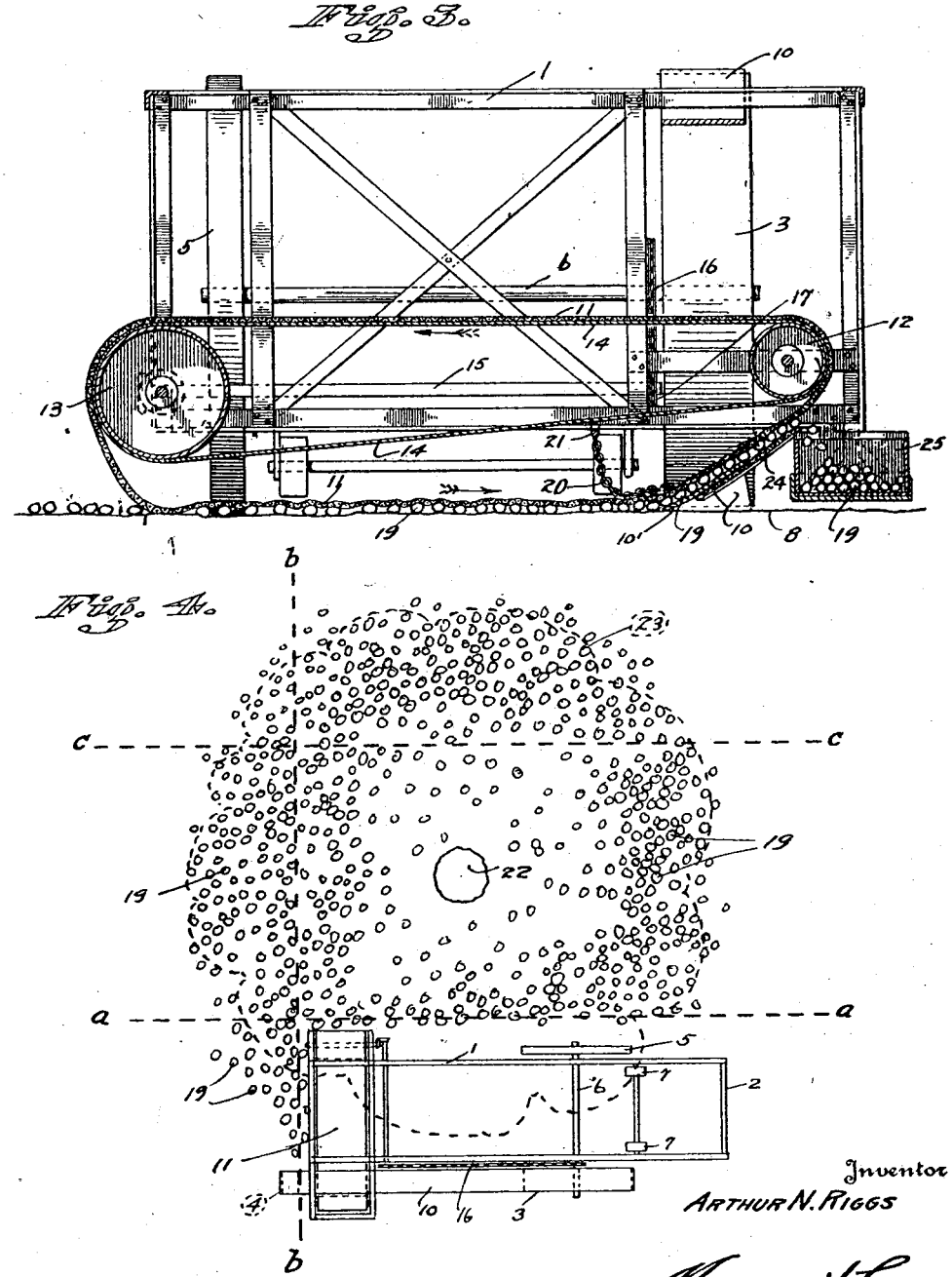

Patented Oct. 27, 1925.

1,558,924

UNITED STATES PATENT OFFICE.

ARTHUR N. RIGGS, OF SAN JOSE, CALIFORNIA.

FRUIT-GATHERING APPARATUS.

Application filed November 14, 1923. Serial No. 674,724.

*To all whom it may concern:*

Be it known that I, ARTHUR N. RIGGS, a citizen of the United States, and a resident of San Jose, county of Santa Clara, State of California, have invented a new and useful Fruit-Gathering Apparatus, of which the following is a specification.

This invention relates to means for gathering fruits, nuts, and similar spheroidal or rollable bodies from the surface of the ground or other fairly smooth surface, and has to do particularly with the gathering of prunes or similar fruits which are permitted to remain on the trees until they ripen and fall to the ground.

The particular objects of my invention are to overcome the present necessity of tediously gathering such fallen fruit or nuts by hand, in providing automatic apparatus which will pick up the fruit without injury and deposit it in boxes for loading on trucks; also, a system of preparing the earth in the fruit dropping zone around each tree so that the fruit or nuts will be more easily gathered by my apparatus; also, a means of separating earthy matter from the fruit before depositing it in the boxes,—and withal, an apparatus of simple construction which may be manipulated by one or two men where an engine driven machine is not desired, yet of a design which may be easily equipped with a motor drive or be pulled by a tractor if desired.

The above and other desirable objects are realized in my apparatus and system of fruit gathering illustrated in the accompanying drawings, and in which Figure 1 is a side elevation of my gathering apparatus; Figure 2, a plan view of Figure 1; Figure 3 a front end sectional elevation of the apparatus along the line 3—3 of Figure 2; Figure 4 is a diagrammatic plan view of a fruit tree with fallen fruit indicated on the dropping zone and my gathering apparatus at work under the tree.

Briefly stated, my system consists in flattening the earth over the fruit dropping zone under each tree by light rolling or otherwise, at a time just prior to the time the fruit is ready to fall, then, after the fruit has fallen, in rolling my apparatus over the zone, working gradually in toward the tree, and whereby the fruit is rolled up on a receiving surface and passed over a screen to remove the dirt, and dropped into the fruit boxes.

In practice, the fruit is rolled up onto the receiving surface by the action of a traveling drag belt operating against the upper part of the rollable fruit, and the receiving surface instead of being a rigid pan tipped against the ground takes the form of a tipped traveling belt in contact with the ground at the tipped portion and operated on the track laying tractor principle so that it is constantly moving to a new position yet its fruit receiving edge is always stationary relative to any fixed point on the earth's surface over which it travels, so that there is no device scraping along the ground with the impossibility of preventing such a device from digging into the ground as it traveled.

In the figures my apparatus takes the form of a frame (1) with a handle (2) for manipulating it. The frame is normally supported on three wheels or rollers,—a large wide faced one (3), a similar faced small one (4) at the forward end of the apparatus in line with the large one, and another one (5) usually idling on the same shaft (6) which supports the wide large one. Also, at the rear end of the apparatus are two idler rollers (7) normally not in contact with the ground (8), and upon which the whole apparatus may be tilted in turning it for rounding corners.

Passing around the wheels (3) and (4) and also supported by an idler (9) is the traveling receiving surface or belt (10). This belt is actuated by the wheels in rolling the apparatus on the ground and maintains a lower strand in contact with the ground as shown in Figure 1.

The apparatus is supposed to travel in the direction of the large arrow and lays the belt (10) against the ground from the roller (4) as it advances.

Across the apparatus running at right angles to the belt (10) is another endless belt (11) supported on light rollers (12) and (13). This belt (11) is of very flexible material such as carpet and hangs loose under the rollers so that it would ordinarily drag on the ground, and its object is to roll the prunes or other fruit along the ground by contact with the upper portion of the spheroidal fruit bodies, and over the belt (10), then over a screen (24) into the box (25).

Since the gathering belt (11) is loose, an auxiliary drive belt (14) is passed around the rollers (12) and (13) to provide sufficient traction for moving it upon revolution of the rollers. The roller (13) is driven for actuating the gathering belt, by means of a shaft (15) geared at one end to the roller and at the other belted at (16) over a pair of pulleys or sprockets (17) and (18), the latter being secured to revolve with the large traction wheel (3) upon rolling the apparatus.

In Figure 3 the action of my gathering elements is shown and the prunes are numbered (19).

To insure the prunes rolling up on to the belt (10), the latter is tipped by being lifted at one side by the dirt screen (24) so that its receiving edge (10') is in contact with the ground and the prunes rolled toward it by the belt (11) will go over its edge and not under it.

To insure a good dragging contact at this point I provide a yielding tho light pressure on top of the belt (11) taking the form of a few chains (20) suspended from a bar (21) and dragging on the belt (11) along the line of the receiving edge 10'. After rolling over the tipped belt the fruit is similarly rolled along up the inclined screen (24) to rid it of loose dirt and small stones, and falls into the box (25) suitably supported on a shelf or otherwise on the frame of the apparatus.

To secure the best results with my apparatus it is desirable that the earth surrounding the trees should be flattened and the fruit dropping zone rolled before the fruit begins to fall, so that the gathering belt will not carry too large a percentage of earthly nodules and small stones.

In actual use the apparatus is rolled in right angle paths about a tree (22) as shown in Figure 4 and wherein the dropping zone is indicated at (23) and the right angle paths by dotted lines a—a, b—b and c—c, it being understood that the machine is successively operated in such paths clear around the tree and the next time working closer to the tree until the flattened falling zone has been thoroughly gone over.

I claim:

1. An apparatus for gathering rollable bodies from the ground comprising means for laying a belt on the ground adjacent the bodies, and means traveling in a direction transverse to the belt for rolling the bodies on the belt.

2. An apparatus for gathering rollable bodies from the ground comprising means for laying a belt on the ground adjacent the bodies, means for tipping the belt with one edge against the ground and the other raised, and means for rolling the bodies on the belt over the tipped edge.

3. An apparatus for gathering fruit or nuts from the ground comprising means for progressively laying a belt on the ground adjacent the fruit, means for tilting the belt sidewise against the ground, and a traveling belt running transversely to the first belt adapted to drag over the fruit and carry it onto the first belt.

4. An apparatus for gathering fruit or nuts from the ground comprising means for progressively laying a belt on the ground adjacent the fruit, means for tilting the belt sidewise against the ground, a screen extending from the side of the tilted belt, and a traveling belt running transversely to the first belt adapted to drag over the fruit and carry it onto the first belt and over the screen.

5. An apparatus for gathering fruit or nuts from the ground comprising a frame and a pair of ground wheels, an endless belt passing over said wheels with one side of the loop in contact with the ground, a transversely arranged endless traveling belt operatively connected with a ground wheel adapted to lie on the fruit and roll it over the ground onto the first belt, and means for holding the transverse belt yieldingly against the fruit.

6. An apparatus for gathering fruit or nuts from the ground comprising a frame and a pair of ground wheels, an endless belt passing over said wheels with one side of the loop in contact with the ground, means for tipping the belt sidewise with one edge against the ground, a screen extending from the side of the tipped portion of the belt, a receiver under the end of the screen, a transversely arranged endless traveling belt operatively connected with a ground wheel adapted to lie on the fruit and roll it over the ground on and over the first belt over the screen and into the receiver, and means for holding the transverse belt yieldingly against the fruit.

ARTHUR N. RIGGS.